April 19, 1966  E. R. MARTIN  3,246,790
BOTTLE CRATES

Filed Jan. 29, 1963  6 Sheets-Sheet 1

Inventor
EDWARD RANKINE MARTIN
By Young & Quigg
Attorney

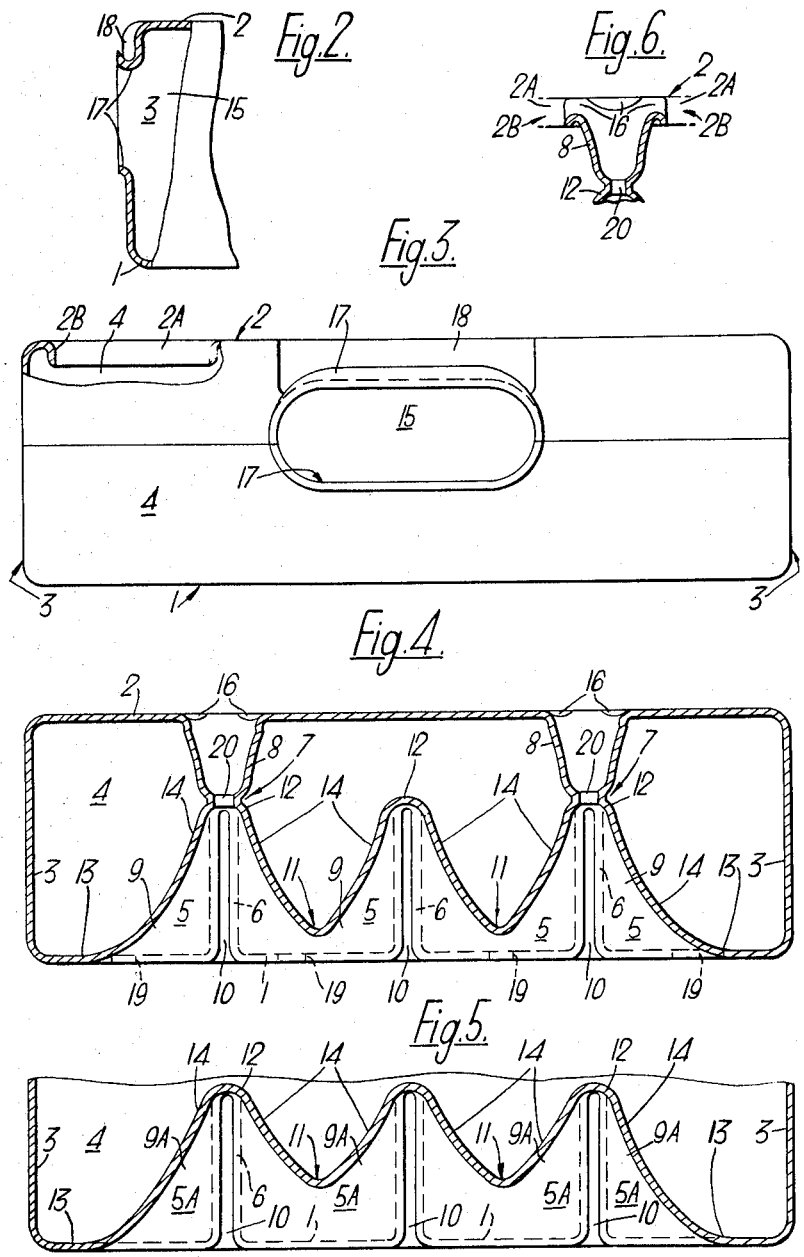

April 19, 1966 E. R. MARTIN 3,246,790
BOTTLE CRATES
Filed Jan. 29, 1963 6 Sheets-Sheet 3
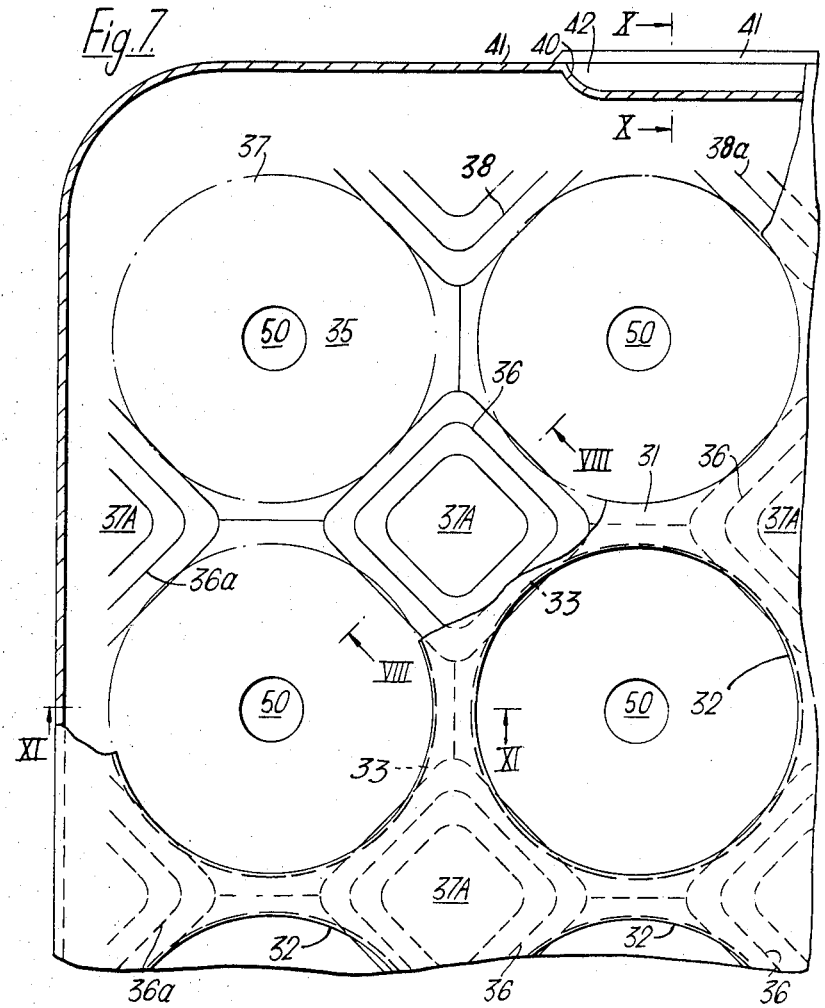
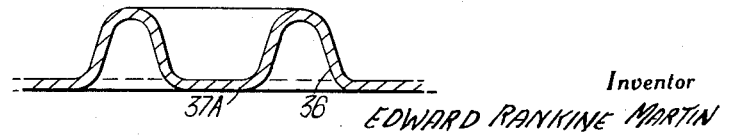
Inventor
EDWARD RANKINE MARTIN
By
Attorney April 19, 1966   E. R. MARTIN   3,246,790
BOTTLE CRATES
Filed Jan. 29, 1963   6 Sheets-Sheet 4
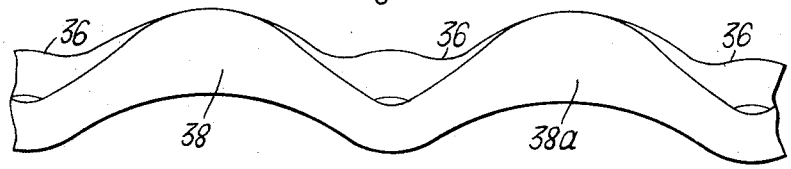
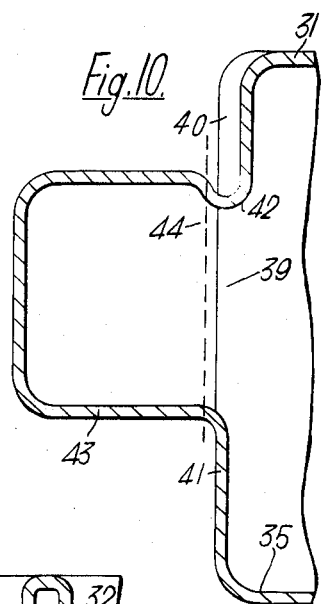
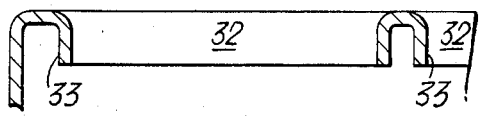
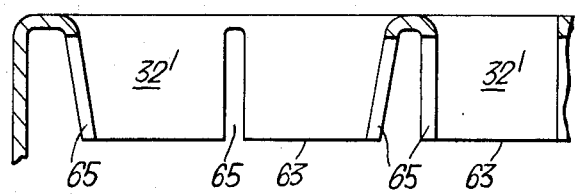
Inventor
EDWARD RANKINE MARTIN
By
Attorney

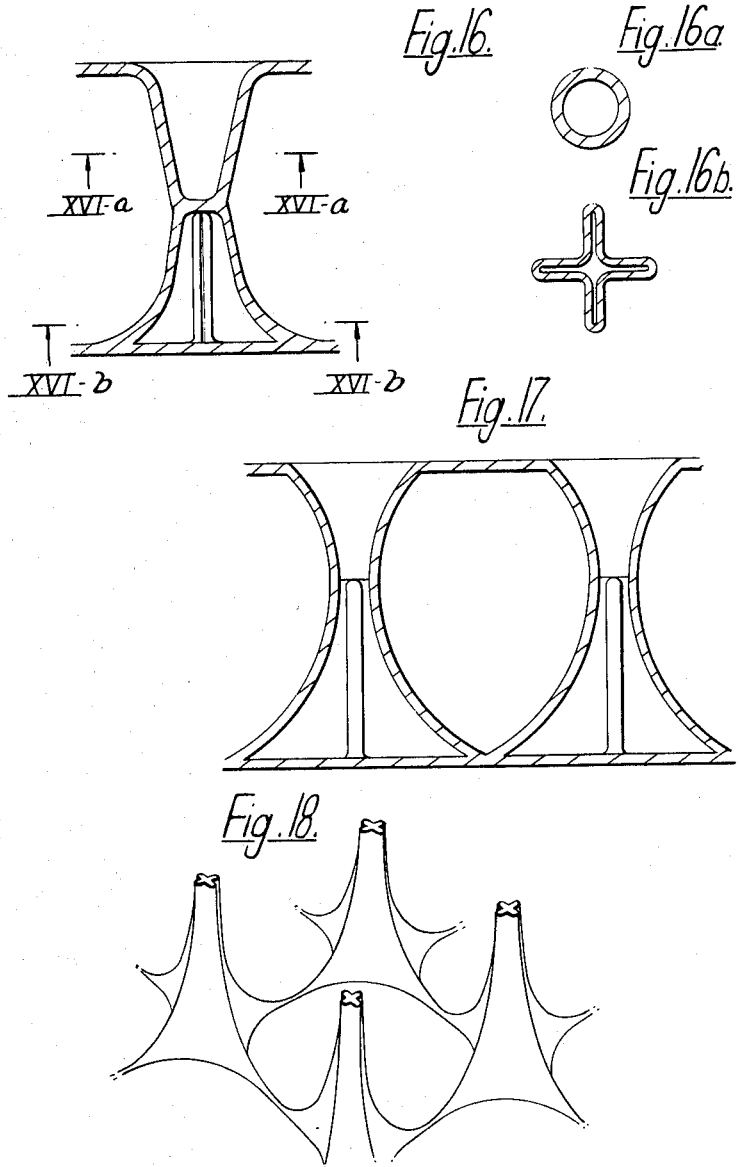

United States Patent Office 3,246,790
Patented Apr. 19, 1966

3,246,790
BOTTLE CRATES
Edward Rankine Martin, Arkley, Hertfordshire, England, assignor to Phillips Petroleum Company, Bartlesville, Okla., a corporation of Delaware
Filed Jan. 29, 1963, Ser. No. 254,820
Claims priority, application Great Britain, Feb. 1, 1962, 3,899/62
6 Claims. (Cl. 220—21)

This application is a continuation-in-part of application Serial No. 242,155, filed December 4, 1962.

This invention relates to bottle crates moulded in plastic and it is an object of this invention to provide an improved plastic bottle crate.

According to this invention a bottle crate is characterised in that it is made of thermoplastic material and is further characterised in that it is provided with bottle separating means. The crate is preferably an integral structure moulded in one piece preferably by blow-moulding. The bottle separating means may comprise apertures in the top wall of the crate, or they may be provided inside the crate, that is by integral formations in the bottom of the crate, or by a separately formed structure inserted within the crate. The bottle separating means may comprise a combination of apertures in the top wall and means inside the crate. The integral bottle separating formations may be inward projections from the bottom and/or top wall. The inward projection from both the bottom and top walls may join together to form reinforcing pillars extending from the bottom wall to the top wall. In the preferred embodiment, these reinforcing pillars form also bottle separators. The pillars are arranged in rows and each bottle is positioned by four pillars. Each pillar is formed of a pair of meeting projections, as described above, the upstanding projection being about two-thirds of the height of the pillar. Each projection is splayed out towards its root, and each upstanding projection has four webs, so that in horizontal cross-section each upstanding projection is cruciform, with the edge of each web flaring outwardly from its top to its foot. These upstanding, webbed projections, which form the lower parts of the pillars, not only separate the bottles, but they also prevent a bottle jamming when inserted non-vertically. Integral carrying formations or handles may also be formed during moulding of the crate. Preferably these handles are provided in the form of apertures of which at least the upper edge is formed on a recessed portion of the wall of the crate and turned outwardly to provide a rounded handling surface.

Although inward projections have been described above as extending from the bottom wall to the top wall, in another form of the invention such projections could extend from one wall into proximity with, but not normally in contact with, the other wall or projections extending therefrom, thereby permitting a limited amount of deflection.

The inward projections are preferably in the form of deep, narrow impressions of closed configuration. The strength resulting from the form of the impressions and the depth thereof acts to provide a suitable degree of restraint to the movement of the bottoms of the bottles. Being narrow, the impressions allow crates filled with bottles of a height such that the necks project clear of the top of the crate, which is a frequent arrangement, to be slid freely over one another when stacked. This can be an important requirement in the distribution of crated bottles, any tendency for necks to catch in the bottoms of crates resting upon them being unacceptable, in many trades, especially when unloading from a lorry at the customers' premises.

In a preferred arrangement the formations are positioned and dimensioned to project inwardly between and engage the bottles of each unit group thereof. The unit group (c.f. the term "unit-cell" as used in crystallography) is usually four bottles, i.e. the crated bottles lie in several rows with the bottles of one row opposite the bottles of the next. Should the bottles of one row be opposite the spaces of the next row, the unit group is three bottles.

For best results the said impressions should have inclined walls. Thus in a preferred arrangement the formations provide frusto-pyramids upstanding from the base of the crate with the apex part inverted to provide a surface level with the outer face of the bottom of the crate, the diagonals of the bases of the frusto-pyramids being parallel with the rows of bottles in each direction. Some of the impressions may be of greater depth than others, for the purpose of restraining the bottoms of bottles against inward movement, preferably bottles adjacent the carrying formations or handles, if these are included. The said deeper projections are, moreover, preferably formed so as to join pairs of the bottle separating formations so that their ends are supported thereby whereby they are strengthened to have very favorable mechanical properties.

If the crate is provided with bottle separating apertures in the top wall, each aperture preferably has its periphery formed with a depending skirt. This skirt may be subdivided, by slitting for example, to provide a plurality of tongues which project into the crate; the tongues thus provided grip the walls of the bottles and because of their natural resilience this effect is obtainable even with bottles whose cross-section is enlarged below the level of the bottle receiving apertures.

In another form of the invention the top of the crate is open and the inward projections or impressions are of sufficient height to separate and locate the bottles without the need for bottle separating apertures in the top wall.

Various embodiments of the invention will now be described in more detail by way of example, with reference to the accompanying drawings, in which:

FIG. 2 is a partial side elevation, partly broken away and in section;

FIG. 3 is an end elevation, partly broken away and in section;

FIG. 4 is a section on the plane IV—IV of FIG. 1;

FIG. 5 is a partial section on the plane V—V of FIG. 1;

FIG. 6 is a partial section on the plane VI—VI of FIG. 1;

FIG. 7 is a plan of part of a second embodiment of bottle crate;

FIG. 8 is a cross-section taken along the line VIII—VIII of FIG. 7;

FIG. 9 is a perspective view of part of the interior of the bottom of the crate of FIG. 7;

FIG. 10 is a cross-section of part of the crate, at an intermediate stage in its manufacture, taken along line X—X of FIG. 7;

FIG. 11 is a cross-section of part of the crate taken along line XI—XI of FIG. 7;

FIG. 12 is a cross-section of a modified crate taken along a line corresponding with line XI—XI of FIG. 7;

FIG. 16 shows a further form of strut;

FIGURES 16A and 16B are taken along the lines XVI–A and XVI–B respectively of FIGURE 16.

FIG. 17 shows a pair of struts forming part of a bottle locating formation, and

FIG. 18 shows a cluster of upward projections.

Figure 1:
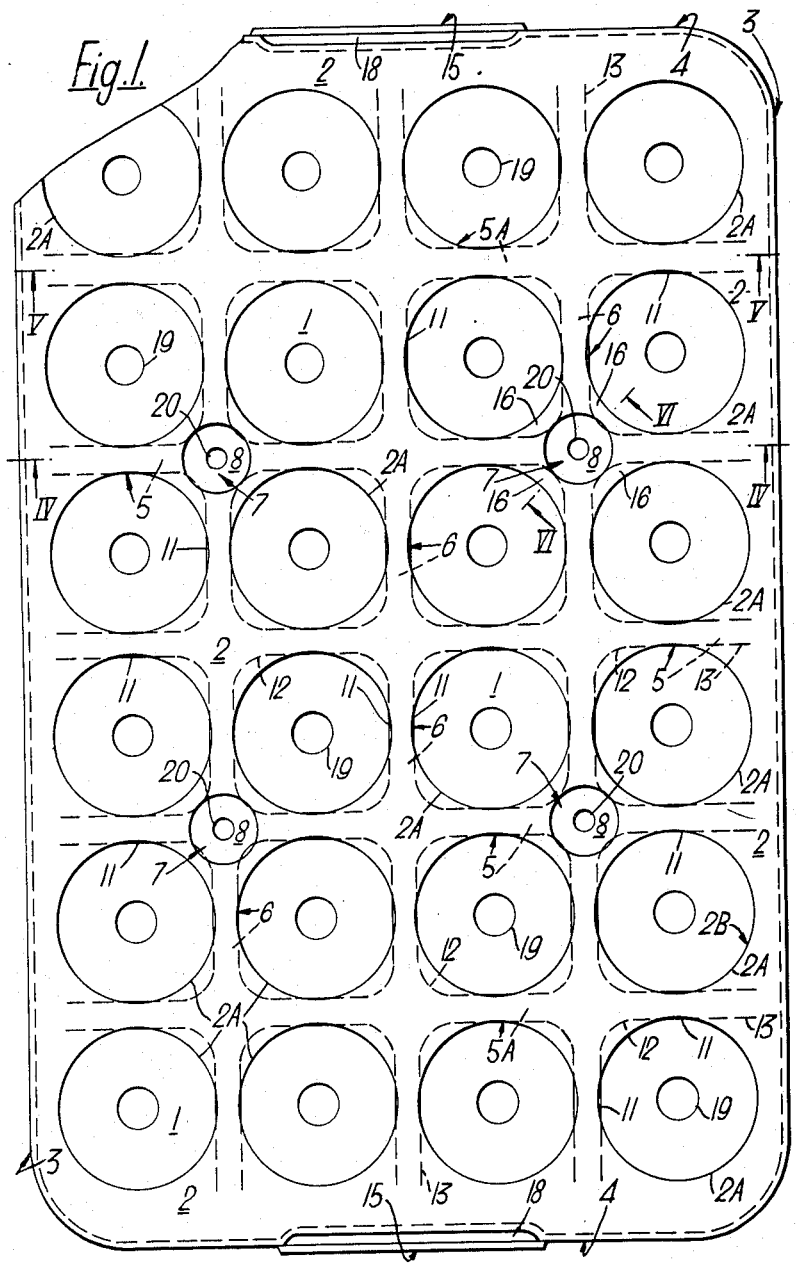
FIG. 1 is a top plan of a first embodiment of bottle crate.
Figure 13:
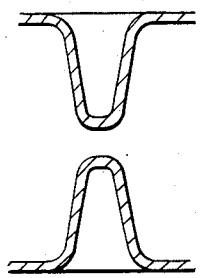
FIG. 13 is a cross-section showing two opposed projections.
Figure 14:
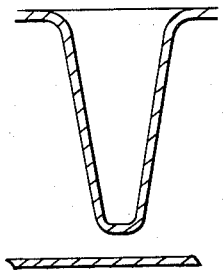
FIG. 14 is a cross-section of a single pendant projection.

The embodiment of a plastic bottle crate now to be described and in accordance with the invention, is an integral structure, formed by blow-moulding an extruded tubular thermoplastic parison in a two-part mould. The blow-moulding technique is well known per se and need not be described here, apart from stating that it is desirable in this case to commence blowing just before the mould parts meet to form the closed mould.

Referring now to FIGS. 1 to 6 of the drawings, the crate has a bottom wall 1, a top wall 2, two side walls 3 and two end walls 4. The top wall is formed with twenty-four apertures 2A, since this embodiment of crate is designed to receive twenty-four bottles, which rest on the bottom wall 1 and project up through the apertures 2A, which act to keep the bottles separate from one another. Each aperture 2A is formed with a depending skirt 2B (FIG. 3).

Further separation of the bottles is achieved by a series of internal walls 5 and 6, walls 5 being at right-angles to walls 6. These walls 5 and 6 (apart from two walls 5A adjacent each end of the crate) have the shape shown in the centre portion of FIG. 4. Referring to FIGS. 1 to 4, at four intersections 7 of walls 5 and 6, the walls, which project inwardly from the bottom wall, are met by downward projections 8 from the top wall, to form four pillars which maintain the correct spacing between the top and bottom walls and generally reinforce the structure as a whole.

Walls 5, 6 and 5A (see FIGS. 4 and 5) have deep slots 9, 10 and 9A respectively, produced by one mould tool during the blow-moulding operation.

Thus each bottle (apart from those adjacent the side or end walls) is surrounded by four wall parts which form a separate compartment for the bottle. Referring to FIG. 4, each such wall part has a central low point or valley 11, and two high points 12. At the four intersections 7, the high points 12 merge with the downward projections 8.

At each end, walls 5, 6 and 5A merge into the bottom wall, as indicated at 13.

The shape of the walls 5, 6 and 5A is such as not only to separate the bottles, but also to ensure that, if a bottle is not inserted exactly vertically downward into the crate, its bottom will strike one of the sloping portions 14 of the walls and be deflected into its proper position.

FIG. 5 shows that, in the two walls 5A adjacent the end walls 4 of the crate, the low points or valleys 11 are not as low as those of the walls 5, see FIG. 4. The purpose of this is to prevent inward movement of the two bottles at each end adjacent handle apertures 15, since it is usual for the projecting neck of one or more of those four bottles to be grasped when the full crate is being handled.

Referring to FIG. 6, it will be noted that at each of the four intersections 7, the four portions 16 of the top wall 2 which lie between the projections 8 and the holes 2A, are depressed.

Referring to FIG. 3, one of the depending skirts 2B of the holes 2A is seen in section. These skirts 2B add to the strength of the top wall 2 and can be used in some instances to grip the bottles.

FIG. 2 shows a handle aperture 15 having rounded lips 17. Above the handle aperture the end wall is recessed at 18.

There are drain holes 19 in the bottom wall 1 at each bottle location and there are drain holes 20 at the bottom of each downward projection 8 at the four intersections 7.

Although only four intersections 7 are shown, it will be understood that a crate could have more than four and in fact there could be downward projections 8 at every intersection of walls 5, 5A and 6.

The holes 2A, 19, 20 are all cut out after the blow-moulding operation.

The handle apertures 15 are preferably formed during the blow-moulding operation, using cores.

Turning now to the further embodiment of the invention illustrated in FIGS. 7 to 12, it will be seen that the crate, which has been blow-moulded from plasticised polyvinyl chloride (or other suitable thermoplastic) loaded with pigment and with a filler, has a top 31 provided with bottle receiving apertures 32 formed with shallow internal strengthening flanges 33—see FIG. 11. Twenty-four such apertures are provided. They are arranged in four rows of six apertures, the rows extending in the direction of the centre line of the crate.

From its under surface, the bottom 35 of the crate is formed with deep narrow V-shaped impressions 36 shaped in the horizontal direction to a generally square configuration. Such impressions constitute bottle bottom locating formations in the shape of frusto-pyramids with their apices inverted to provide central lands 37A level with the bottom of the crate. In other words, the narrow V-shaped impressions 36 constitute upwardly displaced portions of the bottom wall 1 having a closed configuration, the upwardly displaced portions 36 having the shape of frustro-pyramids with downwardly displaced frustro-pyramid portions with the apices of the downwardly displaced frustro-pyramids being substantially coplanar with the bottom wall 1. These locating formations are positioned to lie on the central axes of the unit groups of four apertures and they are dimensioned such that each formation is contacted sideways by the bottoms of four bottles when the crate is filled with bottles of the proper size.

Around its edges the bottom is formed with impressions 36a of V-configuration, each of which is positioned and dimensioned as shown to engage the bottoms of two bottles. One bottle is shown in position by broken lines at 37.

At each end, the crate is formed with a handle in the form of a horizontal slot 39 in the end wall 41.

The three formations of the formations 37A which lie nearest the handle at each end are interconnected by two additional formations 38, 38a constituted by narrow, V-section, impressions deeper than the impressions 36, see especially FIG. 9.

Referring now to FIG. 10, the slots 39 have their upper edges positioned in a recess 40 and turned outwardly at 42 to provide a smooth rounded edge. In the crate as it comes from the mould, the positions of the slots are occupied by protuberances 43 as shown in FIG. 10. The slots themselves are formed by sawing off the protuberances along planes 44 using a pair of circular saws mounted upon a common axle. Not only is the rounded edge formed simply and economically in this manner, but also the overall length of the crate is accurately determined and consistency of overall length is very important when the crate has to be handled by automatic machinery at the customer's premises.

The modified crate to which FIG. 12 refers is identical with the crate of FIGS. 7 to 11 except that each bottle receiving aperture 32' is formed with a convergent skirt 63 formed with four vertical slits 65 which divide it to form convergent tongues.

In the manufacture of crates as shown in FIGS. 7 to 12 of the drawings, the blow-moulding operation yields a moulding which is entirely closed. The bottle locating apertures 32 are opened in a subsequent operation which may be facilitated by forming the mould to provide the moulding with lines of weakness. For a crate modified as described with reference to FIG. 12 the slits are cut by sawing the skirt.

The crates are used with bottles of such diameter as to fit the apertures 32 and the bottom locating formations. The necks stand clear of the top 31 and when the crates are stacked the upper crates rest upon the necks of the bottles contained in the crates below. Even so, except for necks of unusually small size, there is no lateral engagement with the impressions 36 such as to prevent a crate being slid from the top of the stack.

A comfortable hold is given by the form of slots 39 even though the crate be carried in one hand with the thumb in a slot and the fingers grasped round an adjacent bottle. The stability of location of the bottoms of the bottles provided by the impressions 36 and the formations 38, 38a is adequate for this purpose, particularly if these latter formations are undercut. It is also adequate if the crate is carried by grasping, in one hand, the necks of a pair of bottles adjacent to the slots.

Washing is facilitated by drainage holes 50 provided in the bottom of the crate below the centre of the apertures 32, which are large enough to provide rapid drainage and to be formed easily but small enough to avoid engagement with the bottles below when crates are stacked.

The constructions illustrated in FIGS. 13 to 18 show various different forms which the projections from the bottom and/or top walls may take. Thus in FIGS. 13 and 14 there may be seen projections whose purpose is in part to limit the extent to which the top wall of the crate may be pressed down as shown by the gap between the opposed projections of FIG. 13 or by the gap between the pendant projection of FIG. 14 and the bottom wall of the crate.

In the variants shown in FIG. 15 there may be seen four ways in which the projections form a continuous strut extending between the top and bottom walls of the crate; the variants (a) and (c) are formed by the union of opposed projections extending from the top and bottom walls of the crate, the other variants (b) and (d) being formed by the union of a pendant projection with the bottom wall of the crate.

Figure 15A:
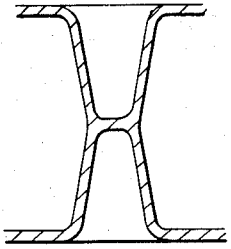
FIG. 15 shows four similar forms (*a*, *b*, *c* and *d*) of strut.
Figure 15B:
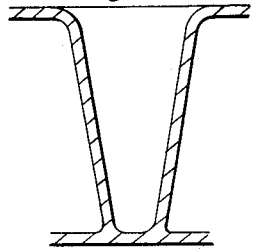
Figure 15C:
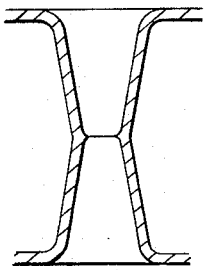
Figure 15D:
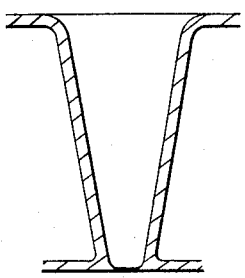

FIG. 16 illustrates a variant of the strut of FIG. 15(a) in which the projection from the bottom wall of the crate is made cruciform in cross-section (detailed in FIGURE 16b) whilst the upper portion of the strut which projects downwards from the top wall of the crate is circular in cross-section (detailed in FIGURE 16a); the cruciform cross-section is of value in forming recesses at the feet of the strut in order to provide a more positive location for the bottom of a bottle as may be realised from a consideration of FIG. 17 which shows in cross-section a bottle location formed between a pair of struts such as those of FIG. 16.

FIG. 18 shows a cluster of projections from the bottom wall of the crate and it can be seen from the perspective view given by this figure that the bottom projections are cruciform like the lower portion of the strut of FIG. 16, and it can more clearly be seen from this view how the bottom of a bottle is positively located in the recesses formed by the cruciform cross-section.

I claim:
1. A crate for bottles and similar articles comprising
   (a) an integral molded in one piece thermoplastic structure having a top wall, a bottom wall and an integrally formed substantially continuous side wall defining the sides of said crate;
   (b) a plurality of bottle receiving apertures in said top wall;
   (c) bottle separating means inside the said crate comprising upwardly displaced portions of said bottom wall, said upwardly displaced portions being adapted to engage the base of a bottle and thus position the same;
   (d) said upwardly displaced portions being located within said crate so that bottles placed away from the side wall of the said crate will be engaged at no less than four points and bottles located adjacent the said side wall will be engaged at no less than two points by said upwardly displaced portions; and
   (e) said upwardly displaced portions of said bottom wall having a closed configuration, said portions being frustro-pyramids having a downwardly displaced frustro-pyramid portion with apices of said downwardly displaced frustro-pyramid being substantially coplanar with said bottom wall.

2. A crate according to claim 1 wherein at least two of said upwardly displaced portions adjacent a side wall are deeper than the remainder of said impressions.

3. A crate according to claim 1 wherein there is provided a handle means comprising a handle aperture which has a rounded lip on the upper outermost portion thereof in a side wall.

4. A crate according to claim 2 wherein said deeper impression joins pairs of bottle separating means in such a manner to prevent lateral movement of said bottle bottoms when the top of said bottle has a lateral force applied thereto.

5. A crate for bottles and similar articles comprising
   (a) an integral molded in one piece thermoplastic structure having a top wall, a bottom wall and an integrally formed substantially continuous side wall defining the sides of said crate;
   (b) at least one bottle receiving aperture in said top wall having a depending lip which is slit in the direction of its depth to provide a plurality of convergent resilient tongues adapted to resiliently engage a bottle extending through said aperture;
   (c) bottle separating means inside the said crate comprising upwardly displaced portions of said bottom wall, said upwardly displaced portions being adapted to engage the base of a bottle and thus position the same;
   (d) the said upwardly displaced portions being located within said crate so that bottles placed away from the side wall of the said crate will be engaged at no less than four points and bottles located adjacent the said side wall will be engaged at no less than two points by said upwardly displaced portions; and
   (e) said upwardly displaced portions of said bottom wall having a closed configuration, said portions being frustro-pyramids having a downwardly displaced frustro-pyramid portion with apices of said downward displaced frustro-pyramids being substantially coplanar with said bottom wall.

6. A crate according to claim 5 wherein at least one side wall has a handle means and said impressions, which are adjacent said handle means, are deeper than the remainder of the impressions, and wherein said deeper impressions adjacent said handle means join pairs of bottle separating means in such a manner as to prevent lateral movement of said bottle bottom when the top of said bottle has a lateral force applied thereto; and
said handle means comprises a handle aperture which has a rounded lip on the upper outermost portion thereof.

References Cited by the Examiner
UNITED STATES PATENTS

| | | | |
|---|---|---|---|
| 1,948,041 | 2/1934 | McCowan | 220—21 |
| 2,063,390 | 12/1936 | Lindell | 220—21 |
| 2,414,171 | 1/1947 | Scharff. | |
| 2,526,716 | 10/1950 | Wales | 220—21 |
| 2,574,983 | 11/1951 | Reed | 220—21 |
| 2,619,251 | 11/1952 | Schmidt | 220—21 |
| 2,974,819 | 3/1961 | Melville. | |
| 3,151,762 | 10/1964 | Vidal | 220—21 |

FOREIGN PATENTS 1,170,638   1/1959   France.

THERON E. CONDON, *Primary Examiner.*